United States Patent [19]
Kurz et al.

[11] Patent Number: 5,955,722
[45] Date of Patent: Sep. 21, 1999

[54] SMART CARD READER

[75] Inventors: Arthur A. Kurz, New Vernon; Horst P. Thiede, Essex Falls; Hans W. Blessing, Warren, all of N.J.

[73] Assignee: A K Stamping Co. Inc., Mountainside, N.J.

[21] Appl. No.: 08/911,302

[22] Filed: Aug. 14, 1997

[51] Int. Cl.⁶ .................................................. G06K 17/00
[52] U.S. Cl. .................... 235/479; 235/486; 235/492; 361/737
[58] Field of Search ..................... 235/380, 438, 235/441, 451, 479, 483, 485, 486, 492, 495; 902/26; 361/686, 737

[56] References Cited

U.S. PATENT DOCUMENTS

| | | | |
|---|---|---|---|
| 5,663,553 | 9/1997 | Aucsmith | 235/492 |
| 5,729,000 | 3/1998 | Sugimoto | 235/492 |
| 5,821,516 | 10/1998 | Vandenengel | 235/441 |

FOREIGN PATENT DOCUMENTS

| | | | |
|---|---|---|---|
| 28892 | 2/1987 | Japan . | |
| 403141486 | 6/1991 | Japan . | |
| 403194680 | 8/1991 | Japan . | |
| 404205079 | 7/1992 | Japan | 235/486 |

*Primary Examiner*—Donald Hajec
*Assistant Examiner*—Drew A. Dunn
*Attorney, Agent, or Firm*—Arthur Jacob

[57] ABSTRACT

A smart card reader includes a housing having a rectangular plan configuration and housing members secured together by sets of complementary overlapping tabs located at the four corners of the rectangular housing and joined together, as by welding. Some of the sets include locator elements on one of the tabs of the set for locating the overlapped tabs accurately relative to one another to assure accurate dimensions in the completed housing. A stiffener plate is secured to at least one of the housing members, as by welding at spaced apart locations along the stiffener plate, to add stiffness to the housing. A lead-in ramp assists in leading the smart card from an inlet section of the reader into an intermediate section of the reader for connection to an electrical connector located in a connector section of the reader.

20 Claims, 4 Drawing Sheets

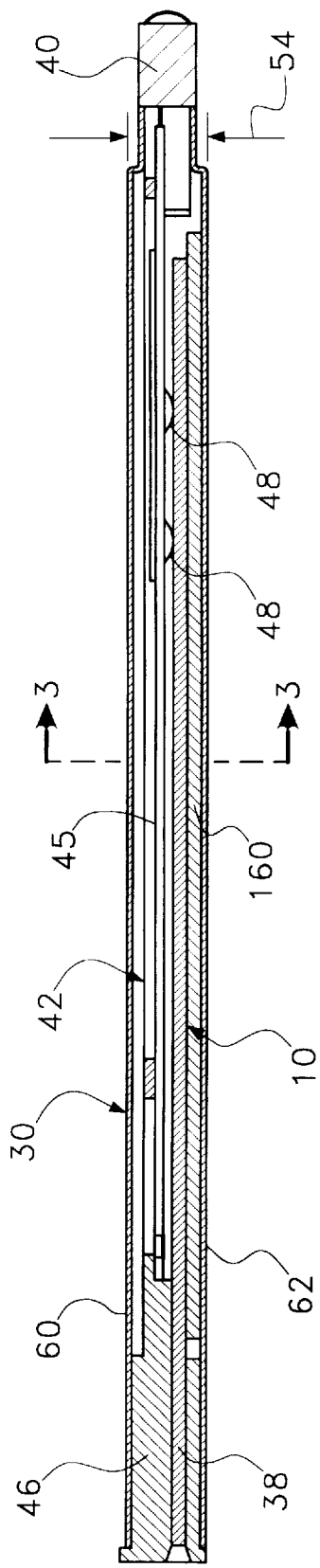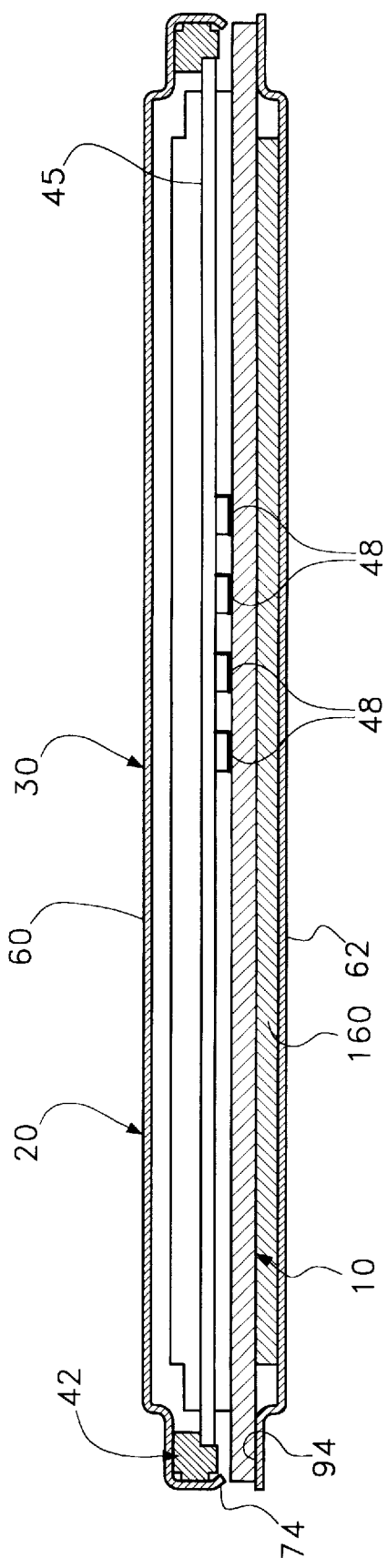
Fig. 2
Fig. 3

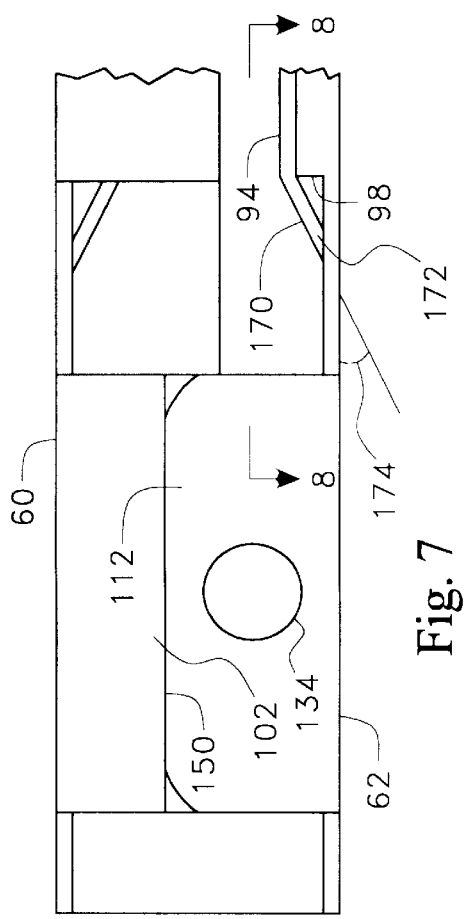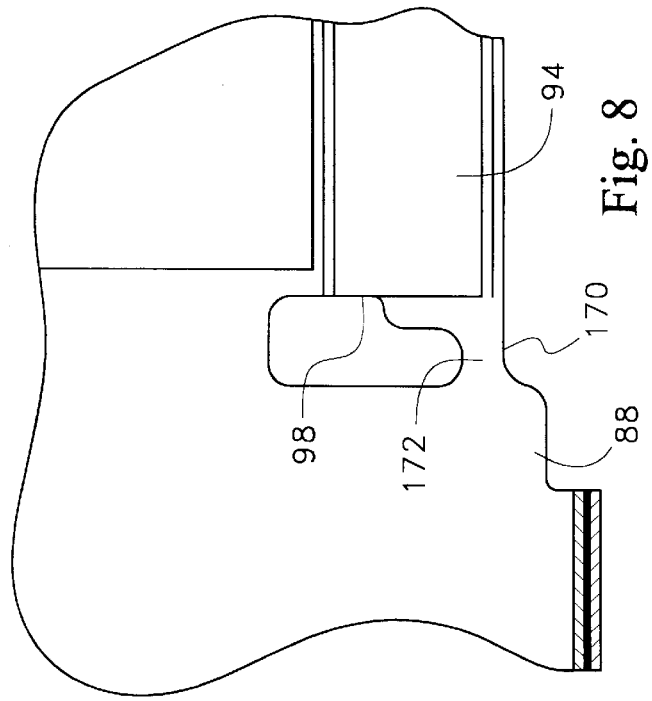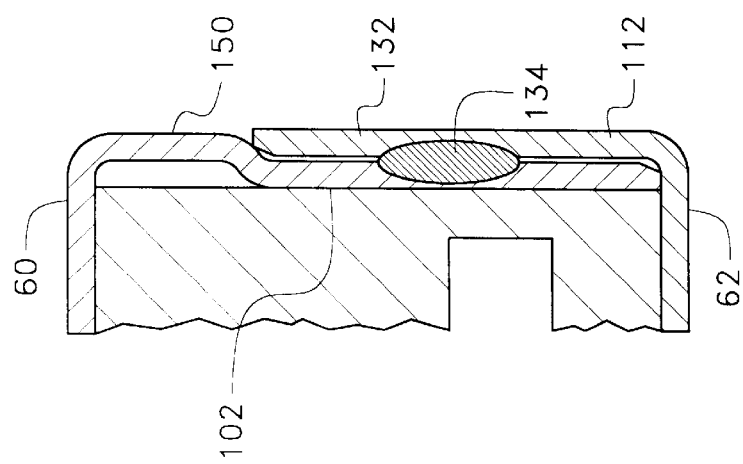

SMART CARD READER

BACKGROUND OF THE INVENTION

1. Field of the Invention

The present invention relates generally to the use of electronic cards commonly known as "smart cards" and pertains, more specifically, to a reader which enables a smart card to be coupled to a host apparatus, such as a personal computer, for the transfer of data between the smart card and the host apparatus.

2. Description of Related Art

Electronic cards, known as smart cards, currently are in use where there is a need for cards capable of controlling more data than the ubiquitous magnetic stripe cards, but not as complex as personal computer cards, known as PC Cards. Thus, smart cards utilize integrated circuits, memories and even microprocessors embedded within a card the size of a standard credit card and offer a versatile combination of relatively low cost with a high degree of ruggedness for a myriad of data transfer transactions. Smart card readers have been designed to accept a smart card and couple the smart card with a personal computer, through the use of a standard receptacle in the computer, such as a PCMCIA slot provided for PC Cards, thereby enabling the smart card to reach into much more data intensive operations. Smart cards also are coupled to digital television controllers, through the use of smart card readers, for controlled access to various digital television programs and services.

BRIEF SUMMARY OF THE INVENTION

The present invention provides an improved smart card reader. As such, the present invention attains several objects and advantages, some of which are summarized as follows: Enables the economical manufacture of an effective smart card reader; provides a smart card reader of accurate dimensions, and requisite strength and rigidity to maintain structural integrity and dimensional stability throughout an extended service life; extends the versatility of a smart card with increased ease of use and a lessened chance of damage to the smart card; provides a smart card reader with the necessary compactness, together with a high degree of ruggedness; fosters more widespread use of smart cards for the control of an increased variety of data transfer transactions; facilitates high speed production and assembly techniques for the economical manufacture of smart card readers in large numbers of consistent high quality.

The above objects and advantages, as well as further objects and advantages, are attained by the present invention, one embodiment of which may be described briefly as an improvement in an electronic card reader for receiving an electronic card having a first predetermined width and a first predetermined height for convenient interconnection with a host apparatus having a receptacle including a second predetermined width complementary to the first predetermined width and a second predetermined height, the reader having a housing including a forward section, a rearward section and an intermediate section located longitudinally between the forward section and the rearward section, at least the forward section and the intermediate section having a third predetermined width complementary to the second predetermined width, and a third predetermined height complementary to the second predetermined height, the improvement comprising: the housing having first and second housing members, each housing member including a panel, a forward segment corresponding to the forward section, a rearward segment corresponding to the rearward section, and an intermediate segment corresponding to the intermediate section and having opposite side edges extending longitudinally between the forward and rearward segments and spaced apart laterally from one another; guideways integral with the panel of each housing member and extending longitudinally along the side edges of the intermediate segment of each housing member between the forward and rearward segments of the housing members, the guideways each having a forward end and rearward end and being spaced altitudinally from one another an altitudinal distance corresponding to the first predetermined height of the electronic card, and the side edges of each of the first and second housing members being spaced apart laterally a lateral distance corresponding to the first predetermined width of the electronic card such that the electronic card is received altitudinally between the guideways and the lateral spacing between the side edges of the intermediate segment of each housing member is complementary to the second predetermined width of the receptacle; first forward securing tabs on the first housing member and second forward securing tabs on the second housing member, the first and second forward securing tabs being complementary to one another and being located on the forward segment of the corresponding housing member, forward of the forward end of each of the guideways, the first forward securing tabs being spaced apart laterally and the second forward securing tabs being spaced apart laterally to establish forward sets of complementary overlapping first and second forward securing tabs placed adjacent each of the opposite side edges of the intermediate housing segments with the lateral spacing between the forward sets of complementary first and second forward securing tabs being no greater than the first predetermined width of the electronic card; forward securing elements for securing together the overlapped first and second forward securing tabs of each forward set; first rearward securing tabs on the first housing member and second rearward securing tabs on the second housing member, the first and second rearward securing tabs being complementary to one another and being located on the rearward segment of the corresponding housing member, rearward of the rearward end of each of the guideways, the first rearward securing tabs being spaced apart laterally and the second rearward securing tabs being spaced apart laterally to establish rearward sets of complementary overlapping first and second rearward securing tabs placed adjacent each of the opposite side edges of the housing members with the lateral spacing between the rearward sets of complementary first and second rearward securing tabs being greater than the first predetermined width of the electronic card such that the electronic card, when received within the reader, passes between the laterally spaced apart rearward sets of complementary overlapping first and second rearward securing tabs; rearward securing elements for securing together the overlapped first and second rearward tabs of each rearward set; and locator elements on at least one of the complementary first and second rearward securing tabs for locating the complementary overlapped first and second rearward securing tabs of each rearward set relative to one another in altitudinal directions and thereby accurately determine the altitudinal distance between the guideways and the third predetermined height of the housing of the reader.

Another embodiment of the present invention may be described briefly as an improvement in an electronic card reader for receiving an electronic card having a first predetermined width and a first predetermined height for convenient interconnection with a host apparatus having a receptacle including a second predetermined width complementary to the first predetermined width and a second predetermined height, the reader having a housing including a forward section, a rearward section and an intermediate section located longitudinally between the forward section and the rearward section, at least the forward section and the intermediate section having a third predetermined width complementary to the second predetermined width, and a third predetermined height complementary to the second predetermined height, the improvement comprising: the housing having first and second housing members, each housing member including a panel, a forward segment corresponding to the forward section, a rearward segment corresponding to the rearward section, and an intermediate segment corresponding to the intermediate section and having opposite side edges extending longitudinally between the forward and rearward segments and spaced apart laterally from one another; guideways integral with the panel of each housing member and extending longitudinally along the side edges of the intermediate segment of each housing member between the forward and rearward segments of the housing members, the guideways each having a forward end and rearward end and being spaced altitudinally from one another an altitudinal distance corresponding to the first predetermined height of the electronic card, and the side edges of each of the first and second housing members being spaced apart laterally a lateral distance corresponding to the first predetermined width of the electronic card such that the electronic card is received altitudinally between the guideways and the lateral spacing between the side edges of the intermediate segment of each housing member is complementary to the second predetermined width of the receptacle; first forward securing tabs on the first housing member and second forward securing tabs on the second housing member, the first and second forward securing tabs being complementary to one another and being located on the forward segment of the corresponding housing member, forward of the forward end of each of the guideways, the first forward securing tabs being spaced apart laterally and the second forward securing tabs being spaced apart laterally to establish forward sets of complementary overlapping first and second forward securing tabs placed adjacent each of the opposite side edges of the intermediate housing segments with the lateral spacing between the forward sets of complementary first and second forward securing tabs being no greater than the first predetermined width of the electronic card; forward securing elements for securing together the overlapped first and second forward securing tabs of each forward set; first rearward securing tabs on the first housing member and second rearward securing tabs on the second housing member, the first and second rearward securing tabs being complementary to one another and being located on the rearward segment of the corresponding housing member, rearward of the rearward end of each of the guideways, the first rearward securing tabs being spaced apart laterally and the second rearward securing tabs being spaced apart laterally to establish rearward sets of complementary overlapping first and second rearward securing tabs placed adjacent each of the opposite side edges of the housing members with the lateral spacing between the rearward sets of complementary first and second rearward securing tabs being greater than the first predetermined width of the electronic card such that the electronic card, when received within the reader, passes between the laterally spaced apart rearward sets of complementary overlapping first and second rearward securing tabs; rearward securing elements for securing together the overlapped first and second rearward tabs of each rearward set; and a stiffener plate affixed to one of the first and second housing members, the stiffener plate being juxtaposed with and extending coextensive with the panel of the one of the first and second housing members.

A further embodiment of the present invention may be described briefly as an improvement in an electronic card reader for receiving an electronic card having a first predetermined width and a first predetermined height for convenient interconnection with a host apparatus having a receptacle including a second predetermined width complementary to the first predetermined width and a second predetermined height, the reader having a housing including a forward section, a rearward section and an intermediate section located longitudinally between the forward section and the rearward section, at least the forward section and the intermediate section having a third predetermined width complementary to the second predetermined width, and a third predetermined height complementary to the second predetermined height, the improvement comprising: the housing having first and second housing members, each housing member including a panel, a forward segment corresponding to the forward section, a rearward segment corresponding to the rearward section, and an intermediate segment corresponding to the intermediate section and having opposite side edges extending longitudinally between the forward and rearward segments and spaced apart laterally from one another; guideways integral with the panel of each housing member and extending longitudinally along the side edges of the intermediate segment of each housing member between the forward and rearward segments of the housing members, the guideways each having a forward end and rearward end and being spaced altitudinally from one another an altitudinal distance corresponding to the first predetermined height of the electronic card, and the side edges of each of the first and second housing members being spaced apart laterally a lateral distance corresponding to the first predetermined width of the electronic card such that the electronic card is received altitudinally between the guideways and the lateral spacing between the side edges of the intermediate segment of each housing member is complementary to the second predetermined width of the receptacle; first forward securing tabs on the first housing member and second forward securing tabs on the second housing member, the first and second forward securing tabs being complementary to one another and being located on the forward segment of the corresponding housing member, forward of the forward end of each of the guideways, the first forward securing tabs being spaced apart laterally and the second forward securing tabs being spaced apart laterally to establish forward sets of complementary overlapping first and second forward securing tabs placed adjacent each of the opposite side edges of the intermediate housing segments with the lateral spacing between the forward sets of complementary first and second forward securing tabs being no greater than the first predetermined width of the electronic card; forward securing elements for securing together the overlapped first and second forward securing tabs of each forward set; first rearward securing tabs on the first housing member and second rearward securing tabs on the second housing member, the first and second rearward securing tabs being complementary to one another and being located on the rearward segment of the corresponding housing member, rearward of the rearward end of each of the guideways, the first rearward securing tabs being spaced apart laterally and the second rearward securing tabs being spaced apart laterally to establish rearward sets of complementary overlapping first and second rearward securing tabs placed adjacent each of the opposite side edges of the housing members with the lateral spacing between the rearward sets of complementary first and second rearward securing tabs being greater than the first predetermined width of the electronic card such that the electronic card, when received within the reader, passes between the laterally spaced apart rearward sets of complementary overlapping first and second rearward securing tabs; rearward securing elements for securing together the overlapped first and second rearward tabs of each rearward set; and a lead-in ramp between the rearward segment of at least one of the first and second housing members and corresponding guideways of the one of the first and second housing members for facilitating movement of the electronic card from the rearward segment into the intermediate segment of the one of the first and second housing members.

BRIEF DESCRIPTION OF THE DRAWINGS

The invention will be understood more fully, while still further objects and advantages will become apparent, in the following detailed description of preferred embodiments of the illustrated in the accompanying drawing, in which:

FIG. 2 is an enlarged cross-sectional view taken along line 2—2 of FIG. 1;

FIG. 3 is an enlarged cross-sectional view taken along line 3—3 of FIG. 2;

FIG. 6 is an enlarged cross-sectional view taken along line 6—6 of FIG. 1;

FIG. 7 is an enlarged detail of the portion of FIG. 1 denoted by numeral 7 in FIG. 1; and FIG. 8 is an enlarged detail of the portion of FIG. 7 denoted by arrows 8 in FIG. 7.

DETAILED DESCRIPTION OF THE INVENTION

Figure 1:
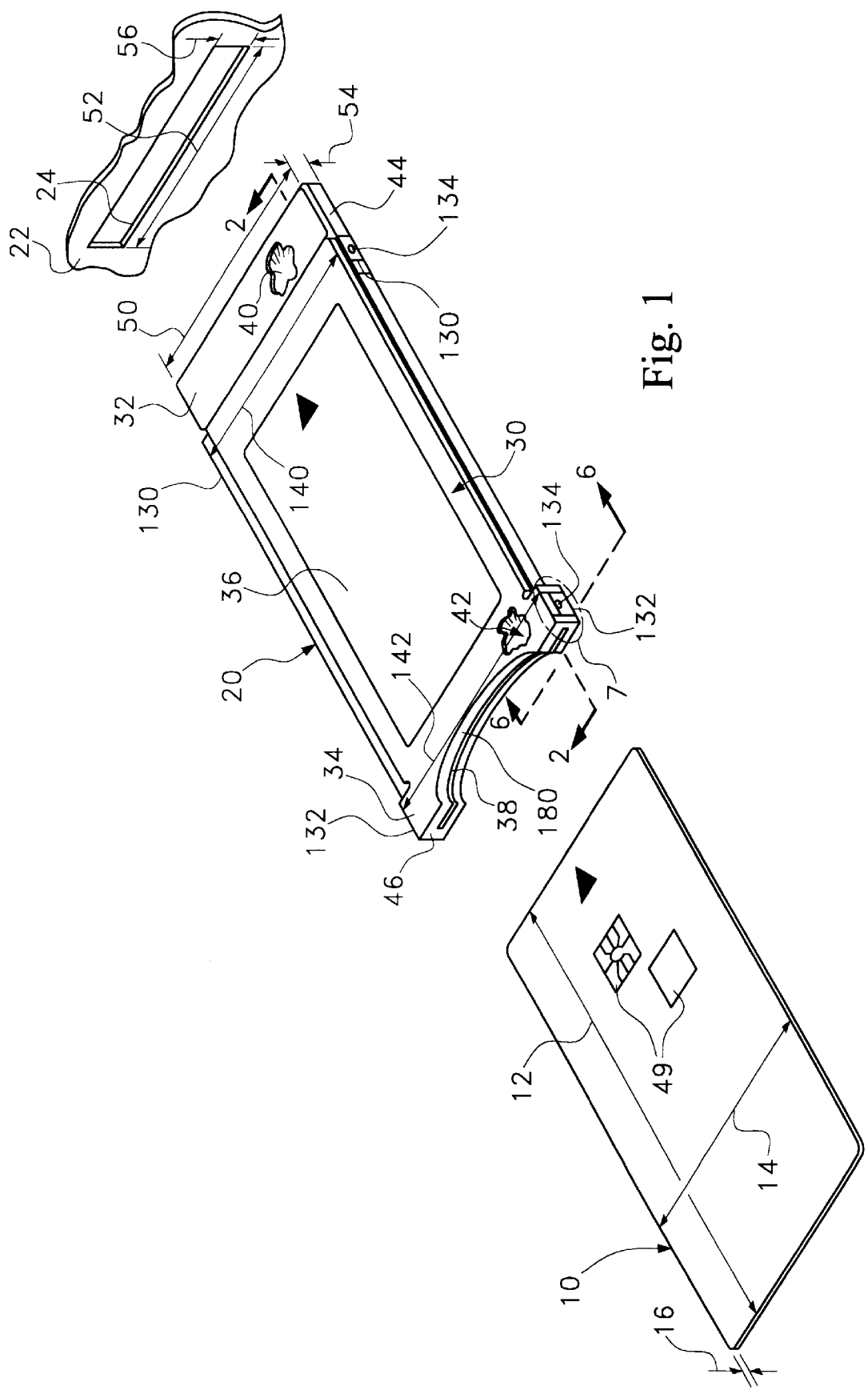
FIG. 1 is a pictorial perspective view of a smart card being inserted into a smart card reader constructed in accordance with the present invention.

Referring now to the drawing, and especially to FIG. 1 thereof, an electronic card shown in the form of a smart card 10 has predetermined dimensions, including a longitudinal length 12, a lateral width 14 and an altitudinal height 16. The preferred dimensions of smart card 10 render the smart card 10 the size of a standard current credit card; that is, smart card 10 preferably has a length of about four inches, a width of about two and one-half inches, and a height of about 0.050 inch. Smart card 10 is shown being inserted into a smart card reader 20, constructed in accordance with the present invention, so as to enable the smart card 10 to be coupled with a host apparatus, in this instance the host apparatus being a personal computer 22 having a receptacle in the form of a standard PCMCIA slot 24.

In essence, reader 20 is an adaptor which adapts smart card 10 for connection to computer 22 for the transfer of data between the smart card 10 and the computer 22. To that end, reader 20 includes a housing 30 for the reception of the smart card 10, the housing 30 having a generally rectangular plan configuration, a connector section illustrated in the form of a forward section 32, an inlet section in the form of a rearward section 34, and an intermediate section 36 located longitudinally between the forward section 32 and the rearward section 34. A slot 38 in the rearward section 34 has a width and a height generally complementary to the width 14 and height 16 of the smart card 10 so that the smart card 10 is received within the slot 38 by sliding the smart card 10 forward, as illustrated. An electrical connector 40 is located in the forward section 32 for connection to the computer 22 when the reader 20 is inserted into the slot 24 of the computer 22. An internal frame 42, constructed of a molded synthetic polymeric material, is located within the housing 30 and includes a forward portion 44 for engaging and locating the electrical connector 40, and a rearward portion 46 which carries the slot 38. An intermediate portion 45 of frame 42 retains a circuit board 47 between the rearward portion 46 and the forward portion 44.

Upon insertion of the smart card 10 fully into the reader 20, and seating of the smart card 10 appropriately in the reader 20, as illustrated in FIGS. 2 and 3, electrical connector elements 48 within the reader 20 engage the smart card 10, and are resiliently biased against electrical contacts 49 provided in the smart card 10 (see FIG. 1), to accomplish an appropriate electrical connection between the smart card 10 and the electrical connector 40. The electrical connector elements 48 are connected electrically to the electrical connector 40, through the circuit board 47, so that upon insertion of the reader 20 into the slot 24 of the computer 22, the smart card 10 is electrically connected to the computer 22 for the transfer of data between the smart card 10 and the computer 22. Thus, the internal dimensions of the reader 20 are generally complementary to the dimensions of the smart card 10 for appropriate reception and seating of the smart card 10 within the reader 20, while corresponding outside dimensions of the reader 20 are generally complementary to the slot 24 of the computer 22 so that the reader 20 is received and seated appropriately within the computer 22 for connection and data transfer, as described.

Current standards for smart cards and for PC Cards dictate a lateral width which is essentially the same for both devices. Hence, both the lateral width 14 of the smart card 10 and the lateral width 50 of the forward section 32 and the intermediate section 36 of the housing 30 are essentially the same, and are generally complementary to lateral width 52 of the slot 24 of the computer 22. The thickness, or altitudinal height 16 of the smart card 10, is considerably less than the thickness, or the altitudinal height 54 of the housing 30 and, hence, the reader 20, which altitudinal height 54 is generally complementary to the altitudinal height 56 of the slot 24. Accordingly, the construction of the reader 20 must take into account the limitations placed upon the dimensions of the reader 20 by the requirements dictated by the standard dimensions of the smart card 10 and the slot 24. The present improvement provides a reader 20 of requisite strength and rigidity within the limitations imposed by the predetermined prescribed dimensions of the smart card 10 and the slot 24.

Figure 4:
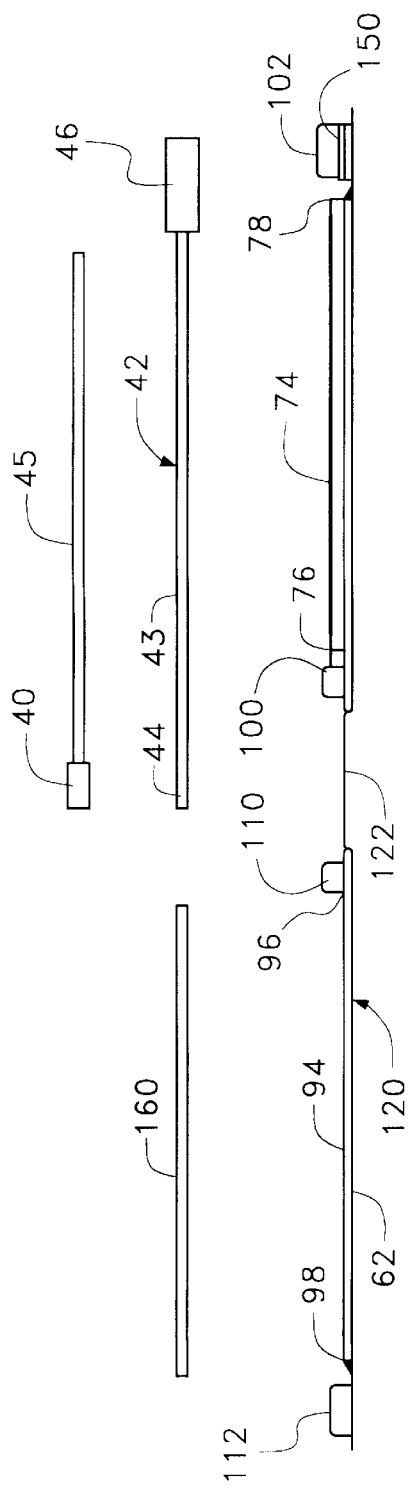
FIG. 4 is an exploded side elevational view illustrating component parts of the smart card reader as the smart card reader is being manufactured.
Figure 5:
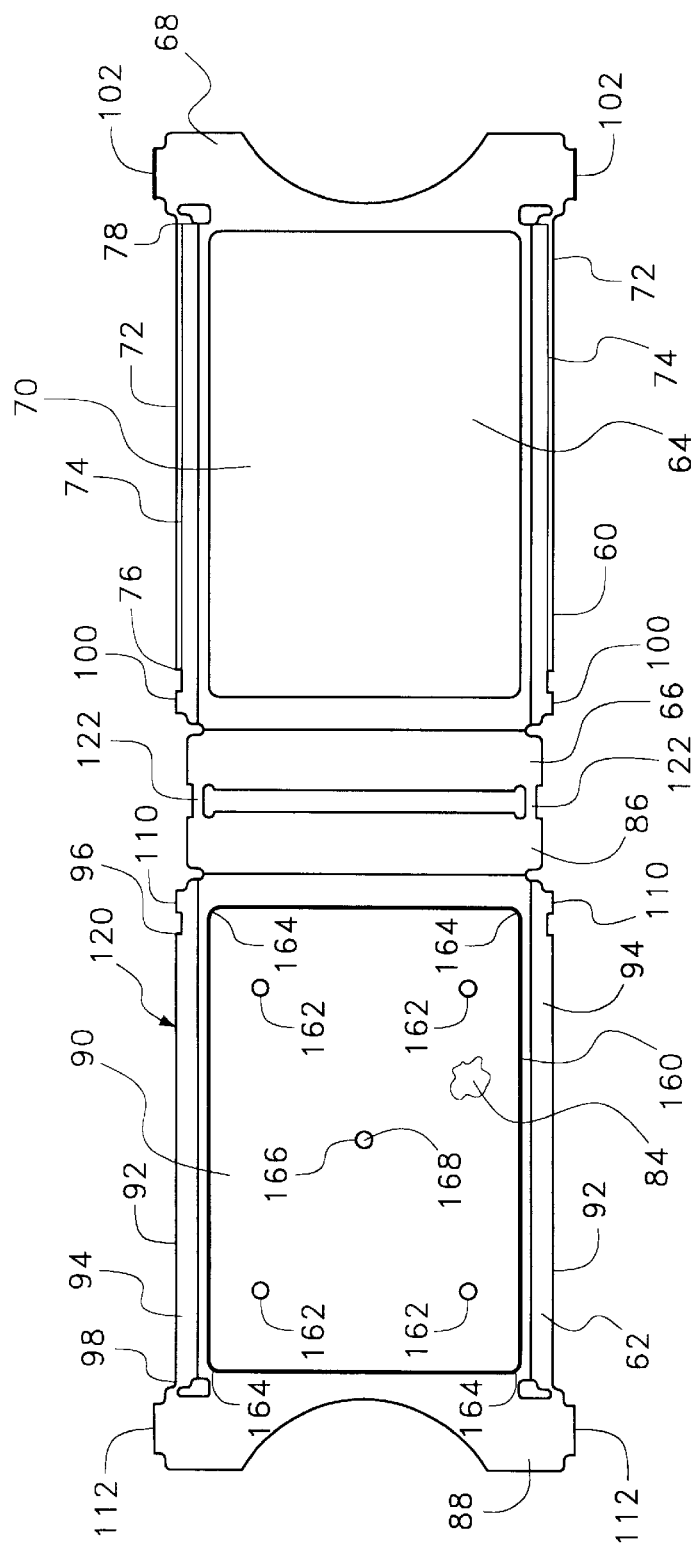
FIG. 5 is a top plan view of the component parts in a further stage of manufacture.

Turning now to FIGS. 4 and 5, housing 30 is seen to include a first housing member 60 and a second housing member 62. First housing member 60 has a panel 64, a forward segment 66, corresponding to the forward section 32 of the housing 30, a rearward segment 68, corresponding to the rearward section 34 of the housing 30, and an intermediate segment 70, corresponding to the intermediate section 36 of housing 30. Intermediate segment 70 has opposite side edges 72 extending longitudinally between the forward and rearward segments 66 and 68 and spaced apart laterally from one another. Guideways 74 are integral with the panel 64 and extend longitudinally along the side edges 72 of the intermediate segment 70, between the forward and rearward segments 66 and 68, the guideways 74 each having a forward end 76 and a rearward end 78. Likewise, second housing member 62 has a panel 84, a forward segment 86, corresponding to the forward section 32 of the housing 30, a rearward segment 88, corresponding to the rearward section 34 of the housing 30, and an intermediate segment 90, corresponding to the intermediate section 36 of housing 30. Intermediate segment 90 has opposite side edges 92 extending longitudinally between the forward and rearward segments 86 and 88 and spaced apart laterally from one another. Guideways 94 are integral with the panel 84 and extend longitudinally along the side edges 92 of the intermediate segment 90, between the forward and rearward segments 86 and 88, the guideways 94 each having a forward end 96 and a rearward end 98. Housing members 60 and 62 have a generally rectangular plan configuration and panels 64 and 84 are essentially flat and planar.

First forward securing tabs 100 are integral with the first housing member 60, extend generally perpendicular to panel 64, and are located on the forward segment 66, forward of the forward ends 76 of corresponding guideways 74. First rearward securing tabs 102 are integral with the first housing member 60, extend generally perpendicular to panel 64, and are located on the rearward segment 68, rearward of the rearward ends 78 of corresponding guideways 74. Second forward securing tabs 110 are integral with the second housing member 62, extend generally perpendicular to panel 84, and are located on the forward segment 86, forward of the forward ends 96 of corresponding guideways 94. Second rearward securing tabs 112 are integral with the second housing member 62, extend generally perpendicular to panel 84, and are located on rearward segment 88, rearward of the rearward ends 98 of corresponding guideways 94.

In the preferred construction of housing 30, the first housing member 60 and the second housing member 62 are joined together in a unitary member 120 of sheet material, the preferred sheet material being stainless steel. Thus, a pair of straps 122 are unitary with each of the housing members 60 and 62 and join the housing members 60 and 62 together along corresponding forward segments 66 and 86 to form the unitary member 120. The unitary member 120 then is folded at the straps 122 to juxtapose the housing members 60 and 62 with one another, as seen in FIGS. 2 and 3, subsequent to the placement of frame 42 and electrical connector 40 upon the housing member 60, such that the housing members 60 and 62 establish the housing 30, with the frame 42 and the electrical connector 40 housed within the housing 30. Once the housing members 60 and 62 are folded into housing 30, corresponding guideways 74 and 94 are juxtaposed with one another and are spaced apart altitudinally to provide for the appropriate guiding and seating of smart card 10 within reader 20, between the guideways 74 and 94, upon insertion of the smart card 10 into the reader 20.

Upon folding the unitary member 120 as set forth above, first forward securing tabs 100 are juxtaposed with corresponding second forward securing tabs 110 to establish sets of complementary overlapping first and second forward securing tabs 100 and 110, as seen at 130 in FIG. 1 Likewise, first rearward securing tabs 102 are juxtaposed with corresponding second rearward securing tabs 112 to establish sets of complementary overlapping first and second rearward securing tabs 102 and 112, as seen at 132 in FIG. 1. The overlapping tabs of each of the sets 130 and 132 are secured together by securing elements to complete the housing 30. While the securing elements may be any one of a variety of securing means, such as fasteners, mechanical staking, adhesives, solder, or brazing, the preferred securing elements are welds, as shown at 134.

The location of the sets 130 and 132 of secured tabs adjacent the four corners of the rectangular plan configuration of the housing 30 provides the housing 30 with the strength and rigidity desired in reader 20, while enabling the reader 20 to adapt smart card 10 for coupling with computer 22 by insertion of the reader 20 into slot 24 of computer 22. Thus, the lateral spacing 140 between the sets 130 of complementary first and second forward securing tabs 100 and 110 is no greater than the width 14 of the smart card 10, and the lateral width of the intermediate section 36 of the housing 30, so that the forward section 32 and the intermediate section 36 of the housing 30 remain complementary to the slot 24 for reception of the reader 20 within the slot 24. On the other hand, the lateral spacing 142 between the sets 132 of complementary first and second rearward securing tabs 102 and 112 is greater than the width 14 of the smart card 10, extending the rearward section 34 of the housing 30 laterally to encompass the rearward portion 46 of frame 42, which rearward portion 46 includes the slot 38. In this manner, the housing 30 is provided with a high degree of structural integrity, while accommodating the width 14 of smart card 10 at the intermediate section 36 of the housing 30, which intermediate section 36 includes width 50 essentially the same as width 14, and providing for the slotted inlet section in the form of rearward section 34. At the same time, the guideways 74 and 94 assure appropriate seating of the smart card 10 in the reader 20, while the altitudinal spacing between the juxtaposed guideways 74 and 94 is maintained for accommodating the smart card 10 between the guideways 74 and 94.

As best seen in FIG. 6, as well as in FIG. 1, in order to assist in attaining the accuracy desired in the altitudinal distance between the juxtaposed guideways 74 and 94 and the altitudinal thickness, or height 54 of the housing 30, locator elements are provided in the form of a shoulder 150 placed on each rearward securing tab 102 so that upon juxtaposition of the corresponding complementary rearward securing tab 112, the rearward securing tab 102 abuts the shoulder 150 to locate the complementary rearward securing tabs 102 and 112 relative to one another in the set 132, before the tabs 102 and 112 are secured together, as by weld 134. Once the overlapping tabs 102 and 112 are located accurately relative to one another by the shoulder 150, the overlapping tabs 102 and 112 are secured together, as by weld 134, to accurately determine the altitudinal distance between corresponding guideways 74 and 94 and the requisite height 54 of the housing 30 and, consequently, of the reader 20.

In order to further enhance the stiffness of the housing 30, and especially to resist distortion of the housing 30 by forces tending to twist the housing 30 about the longitudinal direction or about the lateral direction, a stiffener plate 160 is affixed to housing member 62. As seen in FIGS. 4 and 5, stiffener plate 160 is a generally planar plate of material having a rectangular plan configuration essentially complementary to the panel 84 of housing member 62. Stiffener plate 160 is thicker than the material of housing member 62 and is located against the panel 84, juxtaposed and extending coextensive with the panel 84, inside the housing member 62. The preferred material for stiffener plate 160 is stainless steel, and the stiffener plate 160 preferably is affixed to panel 84 by welding at spaced apart locations 162, adjacent the four corners 164 of the stiffener plate 160, and at a central location 166 adjacent the center 168 of the stiffener plate 160. In the illustrated preferred embodiment, stiffener plate 160 has a thickness of about 0.030 inch, while the material of the housing member 62 has a thickness of about 0.008 inch.

Referring again to FIG. 1, smart card 10 is inserted into reader 20 by advancing smart card 10 into slot 38 located in the rearward section 34 of the housing 30. Turning now to FIGS. 7 and 8, as well as to FIGS. 1 through 5, in order to facilitate movement of the smart card 10 from the rearward section 34 into the intermediate section 36 of the housing 30, a lead-in ramp 170 is provided between the rearward segment 88 of housing member 62 and each guideway 94 along the intermediate segment 90. The lead-in ramp 170 includes an angled strip 172 formed unitary with the rearward segment 88 and the intermediate segment 90 of housing member 62. As best seen in FIG. 7, the angle 174 of each lead-in ramp 170 provides a relatively smooth transition from the rearward segment 88 of housing member 62 to the guideway 94 on the intermediate segment 90, thus facilitating the advance of the smart card 10 from the rearward section 34 of the housing 30 into the intermediate section 36, as the smart card 10 is inserted into the reader 20. In the preferred embodiment, angle 174 is about 27°.

Once smart card 10 is fully seated within reader 20, reader 20 is inserted into slot 24 of computer 22. The complementary dimensions of the forward section 32 and the intermediate section 36 of the housing 30 and the slot 24, together with the longitudinal length of the forward and intermediate sections 32 and 36, assure that the electrical connector 40 is engaged with a complementary electrical connector (not shown) in the computer 22 to couple smart card 10 with computer 22 for the transfer of data between smart card 10 and computer 22. At the same time, rearward section 34 of housing 30, having a width greater than the width of slot 24, remains outside of slot 24 and provides for the gripping and manipulation of housing 30, and reader 20, during insertion of the housing 30 into slot 24 and retraction of the housing 30 from the slot 24. A recess 180 in the rearward section 34 provides finger access to the smart card 10 during insertion of the smart card 10 into reader 20 and removal of the smart card 10 from the reader 20.

It will be seen that the present invention attains the several objects and advantages summarized above; namely: Enables the economical manufacture of an effective smart card reader; provides a smart card reader of accurate dimensions, and requisite strength and rigidity to maintain structural integrity and dimensional stability throughout an extended service life; extends the versatility of a smart card with increased ease of use and a lessened chance of damage to the smart card; provides a smart card reader with the necessary compactness, together with a high degree of ruggedness; fosters more widespread use of smart cards for the control of an increased variety of data transfer transactions; facilitates high speed production and assembly techniques for the economical manufacture of smart card readers in large numbers of consistent high quality.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. An improvement in an electronic card reader for receiving an electronic card having a first predetermined width and a first predetermined height for convenient interconnection with a host apparatus having a receptacle including a second predetermined width complementary to the first predetermined width and a second predetermined height, the reader having a housing including a forward section, a rearward section and an intermediate section located longitudinally between the forward section and the rearward section, at least the forward section and the intermediate section having a third predetermined width complementary to the second predetermined width, and a third predetermined height complementary to the second predetermined height, the improvement comprising:

the housing having first and second housing members, each housing member including a panel, a forward segment corresponding to the forward section, a rearward segment corresponding to the rearward section, and an intermediate segment corresponding to the intermediate section and having opposite side edges extending longitudinally between the forward and rearward segments and spaced apart laterally from one another;

guideways integral with the panel of each housing member and extending longitudinally along the side edges of the intermediate segment of each housing member between the forward and rearward segments of the housing members, the guideways each having a forward end and rearward end and being spaced altitudinally from one another an altitudinal distance corresponding to the first predetermined height of the electronic card, and the side edges of each of the first and second housing members being spaced apart laterally a lateral distance corresponding to the first predetermined width of the electronic card such that the electronic card is received altitudinally between the guideways and the lateral spacing between the side edges of the intermediate segment of each housing member is complementary to the second predetermined width of the receptacle;

first forward securing tabs on the first housing member and second forward securing tabs on the second housing member, the first and second forward securing tabs being complementary to one another and being located on the forward segment of the corresponding housing member, forward of the forward end of each of the guideways, the first forward securing tabs being spaced apart laterally and the second forward securing tabs being spaced apart laterally to establish forward sets of complementary overlapping first and second forward securing tabs placed adjacent each of the opposite side edges of the intermediate housing segments with the lateral spacing between the forward sets of complementary first and second forward securing tabs being no greater than the first predetermined width of the electronic card;

forward securing elements for securing together the overlapped first and second forward securing tabs of each forward set;

first rearward securing tabs on the first housing member and second rearward securing tabs on the second housing member, the first and second rearward securing tabs being complementary to one another and being located on the rearward segment of the corresponding housing member, rearward of the rearward end of each of the guideways, the first rearward securing tabs being spaced apart laterally and the second rearward securing tabs being spaced apart laterally to establish rearward sets of complementary overlapping first and second rearward securing tabs placed adjacent each of the opposite side edges of the housing members with the lateral spacing between the rearward sets of complementary first and second rearward securing tabs being greater than the first predetermined width of the electronic card such that the electronic card, when received within the reader, passes between the laterally spaced apart rearward sets of complementary overlapping first and second rearward securing tabs;

rearward securing elements for securing together the overlapped first and second rearward tabs of each rearward set; and locator elements on at least one of the complementary first and second rearward securing tabs for locating the complementary overlapped first and second rearward securing tabs of each rearward set relative to one another in altitudinal directions and thereby accurately determine the altitudinal distance between the guideways and the third predetermined height of the housing of the reader.

2. The invention of claim 1 wherein the first and second housing members are joined along corresponding forward segments in an integral structure.

3. The invention of claim 2 wherein the integral structure is a unitary member of sheet material.

4. The invention of claim 3 wherein the sheet material is stainless steel.

5. The invention of claim 1 wherein the housing has a generally rectangular plan configuration including four corners, and the sets of complementary overlapping securing tabs are located adjacent the corners.

6. The invention of claim 1 including a stiffener plate affixed to one of the first and second housing members, the stiffener plate being juxtaposed with and extending coextensive with the panel of the one of the first and second housing members.

7. The invention of claim 6 wherein the housing has a generally rectangular plan configuration including four corners, the sets of complementary overlapping securing tabs are located adjacent the corners, and the stiffener plate is generally rectangular and includes four corners and a center, the stiffener plate being affixed to the one of the first and second housing members at spaced apart locations on the stiffener plate, the spaced apart locations being placed adjacent the four corners and the center of the stiffener plate.

8. The invention of claim 7 wherein the stiffener plate is welded to the one of the first and second housing members at each of the spaced apart locations.

9. The invention of claim 1 including a lead-in ramp between the rearward segment of at least one of the first and second housing members and corresponding guideways of the one of the first and second housing members for facilitating movement of the electronic card from the rearward segment into the intermediate segment of the one of the first and second housing members during insertion of the electronic card through the rearward section of the housing into the intermediate section.

10. The invention of claim 9 wherein each lead-in ramp includes an angled strip unitary with the rearward segment of the one of the first and second housing members and unitary with the corresponding intermediate housing member.

11. An improvement in an electronic card reader for receiving an electronic card having a first predetermined width and a first predetermined height for convenient interconnection with a host apparatus having a receptacle including a second predetermined width complementary to the first predetermined width and a second predetermined height, the reader having a housing including a forward section, a rearward section and an intermediate section located longitudinally between the forward section and the rearward section, at least the forward section and the intermediate section having a third predetermined width complementary to the second predetermined width, and a third predetermined height complementary to the second predetermined height, the improvement comprising:

the housing having first and second housing members, each housing member including a panel, a forward segment corresponding to the forward section, a rearward segment corresponding to the rearward section, and an intermediate segment corresponding to the intermediate section and having opposite side edges extending longitudinally between the forward and rearward segments and spaced apart laterally from one another;

guideways integral with the panel of each housing member and extending longitudinally along the side edges of the intermediate segment of each housing member between the forward and rearward segments of the housing members, the guideways each having a forward end and rearward end and being spaced altitudinally from one another an altitudinal distance corresponding to the first predetermined height of the electronic card, and the side edges of each of the first and second housing members being spaced apart laterally a lateral distance corresponding to the first predetermined width of the electronic card such that the electronic card is received altitudinally between the guideways and the lateral spacing between the side edges of the intermediate segment of each housing member is complementary to the second predetermined width of the receptacle;

first forward securing tabs on the first housing member and second forward securing tabs on the second housing member, the first and second forward securing tabs being complementary to one another and being located on the forward segment of the corresponding housing member, forward of the forward end of each of the guideways, the first forward securing tabs being spaced apart laterally and the second forward securing tabs being spaced apart laterally to establish forward sets of complementary overlapping first and second forward securing tabs placed adjacent each of the opposite side edges of the intermediate housing segments with the lateral spacing between the forward sets of complementary first and second forward securing tabs being no greater than the first predetermined width of the electronic card;

forward securing elements for securing together the overlapped first and second forward securing tabs of each forward set;

first rearward securing tabs on the first housing member and second rearward securing tabs on the second housing member, the first and second rearward securing tabs being complementary to one another and being located on the rearward segment of the corresponding housing member, rearward of the rearward end of each of the guideways, the first rearward securing tabs being spaced apart laterally and the second rearward securing tabs being spaced apart laterally to establish rearward sets of complementary overlapping first and second rearward securing tabs placed adjacent each of the opposite side edges of the housing members with the lateral spacing between the rearward sets of complementary first and second rearward securing tabs being greater than the first predetermined width of the electronic card such that the electronic card, when received within the reader, passes between the laterally spaced apart rearward sets of complementary overlapping first and second rearward securing tabs;

rearward securing elements for securing together the overlapped first and second rearward tabs of each rearward set; and a stiffener plate affixed to one of the first and second housing members, the stiffener plate being juxtaposed with and extending coextensive with the panel of the one of the first and second housing members.

12. The invention of claim 11 wherein the housing has a generally rectangular plan configuration including four corners, the sets of complementary overlapping securing tabs are located adjacent the corners, and the stiffener plate is generally rectangular and includes four corners and a center, the stiffener plate being affixed to the one of the first and second housing members at spaced apart locations on the stiffener plate, the spaced apart locations being placed adjacent the four corners and the center of the stiffener plate.

13. The invention of claim 12 wherein the stiffener plate is welded to the one of the first and second housing members at each of the spaced apart locations.

14. The invention of claim 11 wherein the first and second housing members are joined along corresponding forward segments in an integral structure.

15. The invention of claim 14 wherein the integral structure is a unitary member of sheet material.

16. An improvement in an electronic card reader for receiving an electronic card having a first predetermined width and a first predetermined height for convenient interconnection with a host apparatus having a receptacle including a second predetermined width complementary to the first predetermined width and a second predetermined height, the reader having a housing including a forward section, a rearward section and an intermediate section located longitudinally between the forward section and the rearward section, at least the forward section and the intermediate section having a third predetermined width complementary to the second predetermined width, and a third predetermined height complementary to the second predetermined height, the improvement comprising:

the housing having first and second housing members, each housing member including a panel, a forward segment corresponding to the forward section, a rearward segment corresponding to the rearward section, and an intermediate segment corresponding to the intermediate section and having opposite side edges extending longitudinally between the forward and rearward segments and spaced apart laterally from one another;

guideways integral with the panel of each housing member and extending longitudinally along the side edges of the intermediate segment of each housing member between the forward and rearward segments of the housing members, the guideways each having a forward end and rearward end and being spaced altitudinally from one another an altitudinal distance corresponding to the first predetermined height of the electronic card, and the side edges of each of the first and second housing members being spaced apart laterally a lateral distance corresponding to the first predetermined width of the electronic card such that the electronic card is received altitudinally between the guideways and the lateral spacing between the side edges of the intermediate segment of each housing member is complementary to the second predetermined width of the receptacle;

first forward securing tabs on the first housing member and second forward securing tabs on the second housing member, the first and second forward securing tabs being complementary to one another and being located on the forward segment of the corresponding housing member, forward of the forward end of each of the guideways, the first forward securing tabs being spaced apart laterally and the second forward securing tabs being spaced apart laterally to establish forward sets of complementary overlapping first and second forward securing tabs placed adjacent each of the opposite side edges of the intermediate housing segments with the lateral spacing between the forward sets of complementary first and second forward securing tabs being no greater than the first predetermined width of the electronic card;

forward securing elements for securing together the overlapped first and second forward securing tabs of each forward set;

first rearward securing tabs on the first housing member and second rearward securing tabs on the second housing member, the first and second rearward securing tabs being complementary to one another and being located on the rearward segment of the corresponding housing member, rearward of the rearward end of each of the guideways, the first rearward securing tabs being spaced apart laterally and the second rearward securing tabs being spaced apart laterally to establish rearward sets of complementary overlapping first and second rearward securing tabs placed adjacent each of the opposite side edges of the housing members with the lateral spacing between the rearward sets of complementary first and second rearward securing tabs being greater than the first predetermined width of the electronic card such that the electronic card, when received within the reader, passes between the laterally spaced apart rearward sets of complementary overlapping first and second rearward securing tabs;

rearward securing elements for securing together the overlapped first and second rearward tabs of each rearward set; and a lead-in ramp between the rearward segment of at least one of the first and second housing members and corresponding guideways of the one of the first and second housing members for facilitating movement of the electronic card from the rearward segment into the intermediate segment of the one of the first and second housing members.

17. The invention of claim 16 wherein each lead-in ramp includes an angled strip unitary with the rearward segment of the one of the first and second housing members and unitary with the corresponding intermediate housing member.

18. The invention of claim 16 wherein the first and second housing members are joined along corresponding forward segments in an integral structure.

19. The invention of claim 18 wherein the integral structure is a unitary member of sheet material.

20. The invention of claim 16 wherein the housing has a generally rectangular plan configuration including four corners, and the sets of complementary overlapping securing tabs are located adjacent the corners.

* * * * *